US010145169B2

(12) United States Patent
Walsh et al.

(10) Patent No.: US 10,145,169 B2
(45) Date of Patent: **\*Dec. 4, 2018**

(54) MOLDED DOOR FACING BLANK AND METHOD OF FORMING SAME

(71) Applicant: Masonite Corporation, Tampa, FL (US)

(72) Inventors: Jason M. Walsh, Batavia, IL (US); Mark A. Ruggie, Kingston, IL (US); Steven K. Lynch, St. Charles, IL (US); Robert C. Allen, Elburn, IL (US)

(73) Assignee: Masonite Corporation, Tampa, FL (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/156,558

(22) Filed: May 17, 2016

(65) Prior Publication Data

US 2016/0258207 A1    Sep. 8, 2016

Related U.S. Application Data

(60) Continuation of application No. 13/828,145, filed on Mar. 14, 2013, now Pat. No. 9,341,016, which is a
(Continued)

(51) Int. Cl.
| | |
|---|---|
| *E06B 3/70* | (2006.01) |
| *E06B 3/74* | (2006.01) |
| *E06B 3/78* | (2006.01) |
| *B30B 7/02* | (2006.01) |
| *B29L 31/00* | (2006.01) |

(Continued)

(52) U.S. Cl.
CPC .............. *E06B 3/7001* (2013.01); *E06B 3/74* (2013.01); *E06B 3/78* (2013.01); *B29C 59/00* (2013.01); *B29C 59/02* (2013.01); *B29L 2031/724* (2013.01); *B30B 7/02* (2013.01); *B44C 1/24* (2013.01); *E06B 2003/7096* (2013.01);
(Continued)

(58) Field of Classification Search
CPC . E06B 3/74; E06B 3/78; E06B 3/7001; B32B 3/30; Y10T 428/2457; Y10T 428/24736; B29L 2031/724; B44C 1/24
See application file for complete search history.

(56) References Cited

U.S. PATENT DOCUMENTS

| | | |
|---|---|---|
| 2,457,129 A | 12/1948 | Collings |
| 2,809,908 A | 10/1957 | French |

(Continued)

FOREIGN PATENT DOCUMENTS

| | | |
|---|---|---|
| FR | 2024735 | 8/1970 |
| WO | 93/22115 A1 | 11/1993 |
| WO | 98/31911 A1 | 7/1998 |

*Primary Examiner* — Donald J Loney
(74) *Attorney, Agent, or Firm* — Berenato & White, LLC

(57) ABSTRACT

The present invention is directed to a door facing blank having a first major surface with a design element formed therein, and an opposite second major surface. At least three longitudinally extending spaced stile receiving areas are disposed on the second major surface. Two of the stile receiving areas define a first width, and three of the stile receiving areas define a second width greater than the first width. The door facing blank may be trimmed to form a door facing having a selected width. A method of forming a door facing blank, and a mold press for forming a door facing blank are also disclosed.

20 Claims, 8 Drawing Sheets

Related U.S. Application Data division of application No. 11/785,753, filed on Apr. 19, 2007, now Pat. No. 8,563,118.

(51) Int. Cl.
  *B44C 1/24* (2006.01)
  *B29C 59/00* (2006.01)
  *B29C 59/02* (2006.01)

(52) U.S. Cl.
  CPC ........ *Y10T 156/12* (2015.01); *Y10T 428/2457* (2015.01); *Y10T 428/24736* (2015.01)

(56) References Cited

U.S. PATENT DOCUMENTS

| | | | |
|---|---|---|---|
| 4,097,100 A * | 6/1978 | Sauder | A47B 96/201 312/204 |
| 4,182,080 A | 1/1980 | Naylor | |
| 4,364,203 A | 12/1982 | Seaholm et al. | |
| 4,610,900 A | 9/1986 | Nishibori | |
| 4,876,838 A | 10/1989 | Hagemeyer | |
| 5,003,745 A | 4/1991 | Fang | |
| 5,075,059 A | 12/1991 | Green | |
| 5,291,688 A | 3/1994 | Pederson | |
| 5,568,713 A | 10/1996 | Gagne et al. | |
| 5,845,439 A | 12/1998 | Hendley | |
| 5,887,402 A | 3/1999 | Ruggie et al. | |
| 5,918,434 A | 7/1999 | Ballantyne et al. | |
| 6,479,128 B1 * | 11/2002 | Schafernak | B27N 3/00 144/358 |
| 6,485,800 B1 | 11/2002 | Liittschwager et al. | |
| 7,137,232 B2 | 11/2006 | Lynch et al. | |
| 7,284,352 B2 | 10/2007 | Lynch et al. | |
| 7,370,454 B2 | 5/2008 | Lynch et al. | |
| 8,563,118 B2 * | 10/2013 | Walsh | E06B 3/7001 428/167 |
| 2004/0003560 A1 | 1/2004 | Lynch et al. | |
| 2004/0103615 A1 | 6/2004 | Lynch et al. | |
| 2004/0221531 A1 | 11/2004 | Lynch et al. | |
| 2005/0115198 A1 | 6/2005 | Lynch et al. | |
| 2006/0260273 A1 | 11/2006 | Piumelli | |
| 2007/0028559 A1 | 2/2007 | Lynch et al. | |

\* cited by examiner

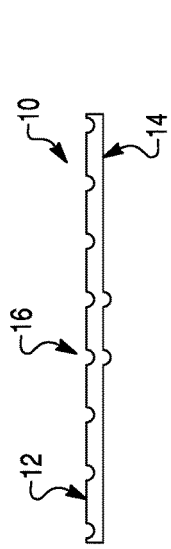
Fig. 2
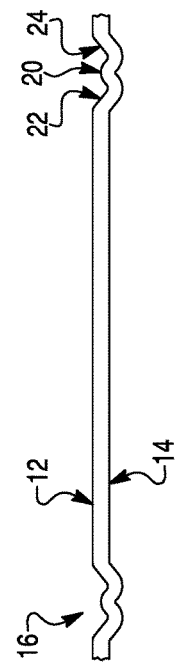
Fig. 3
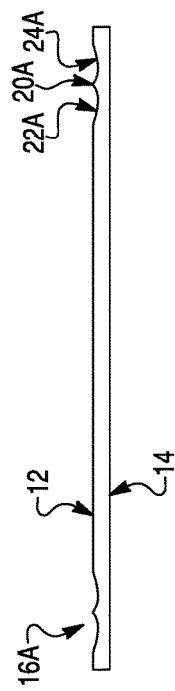
Fig. 4
Fig. 1

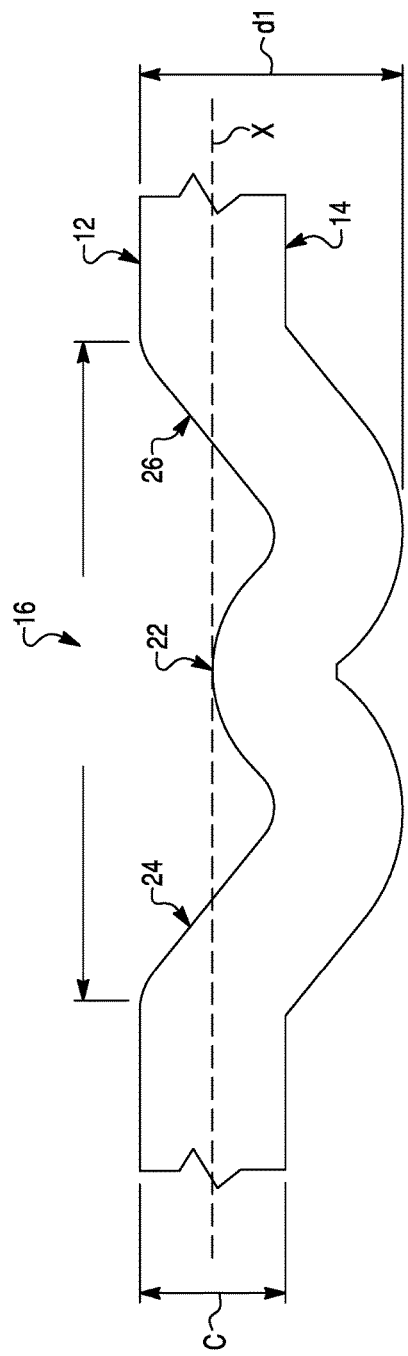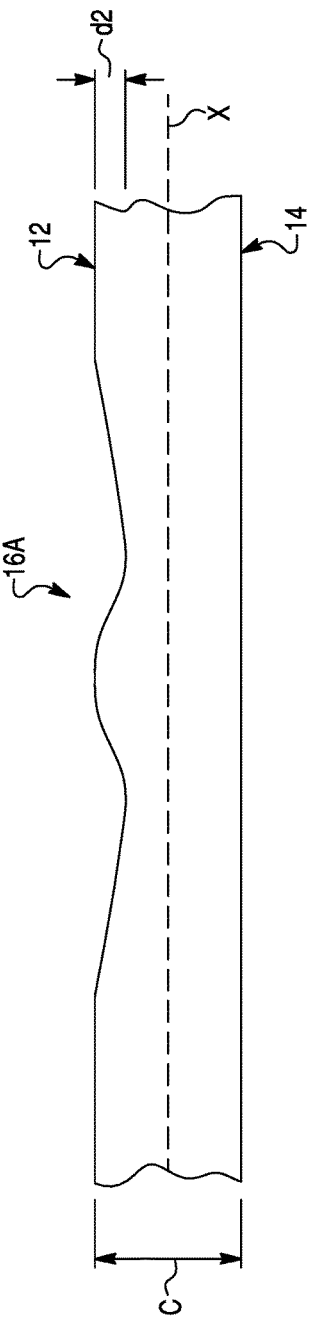

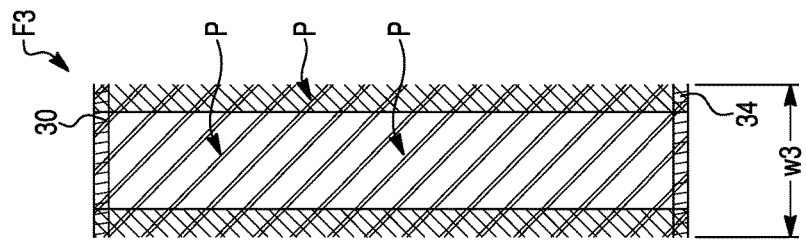
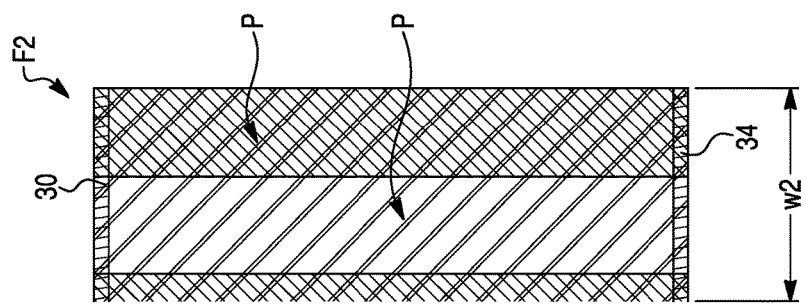
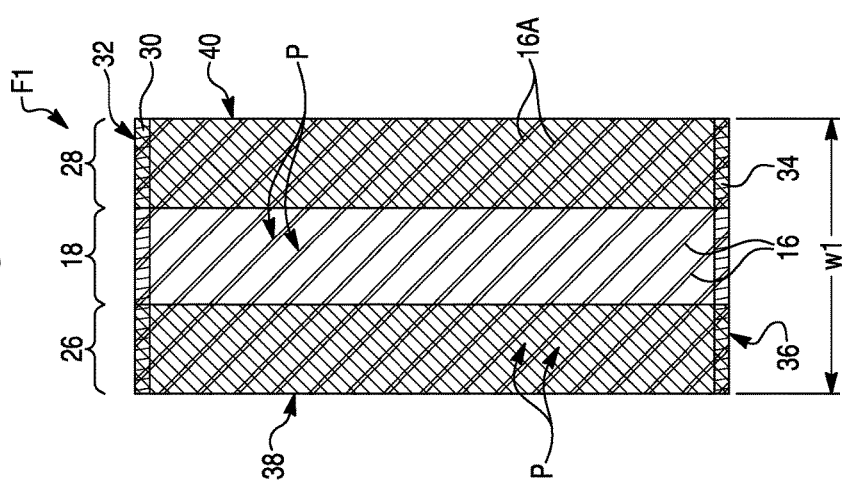

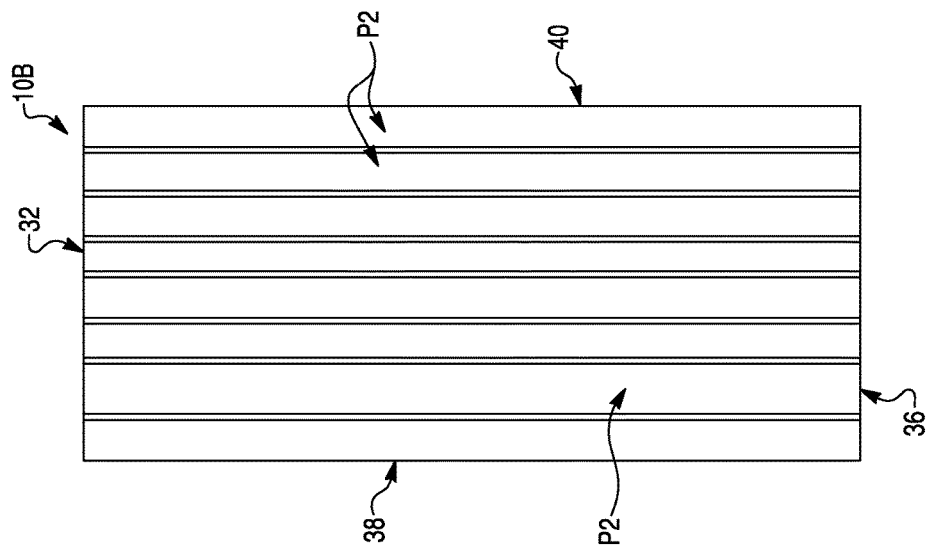
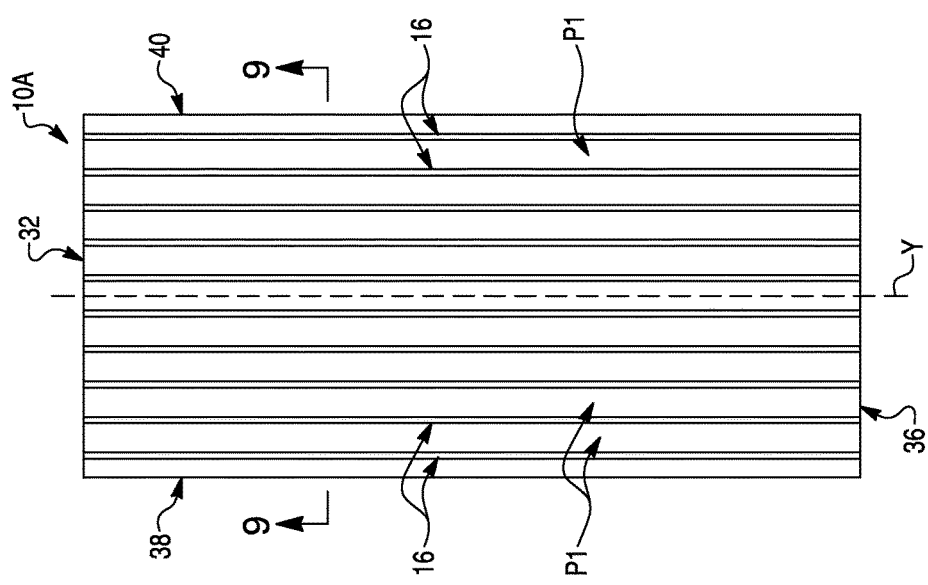

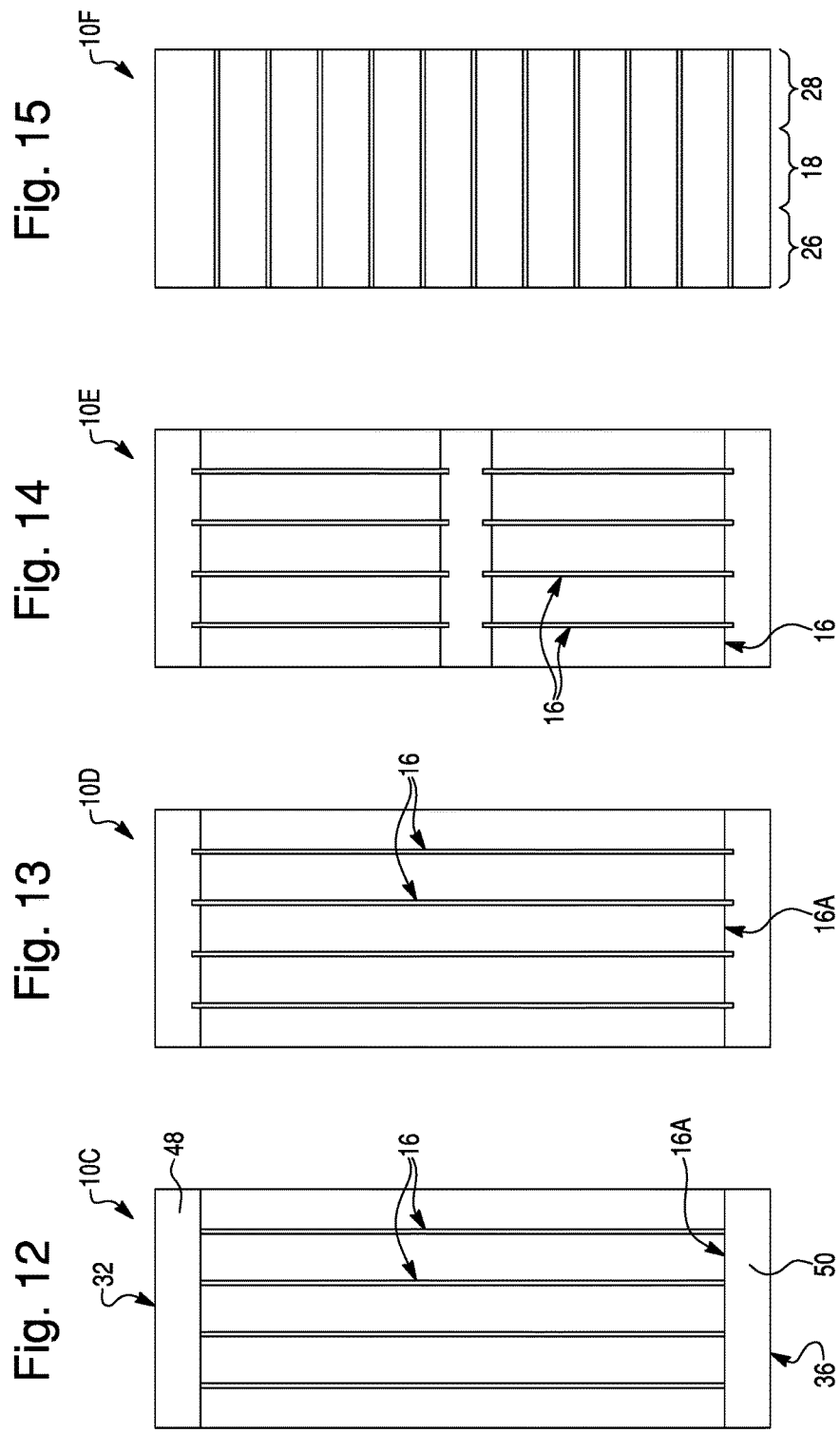

MOLDED DOOR FACING BLANK AND METHOD OF FORMING SAME

CROSS-REFERENCE TO RELATED APPLICATIONS AND CLAIM TO PRIORITY

This application is a continuation of non-provisional application Ser. No. 13/828,145 filed Mar. 14, 2013, now U.S. Pat. No. 9,341,016, issued May 17, 2016, which is a divisional application of Ser. No. 11/785,753, filed Apr. 19, 2007, now U.S. Pat. No. 8,563,118, issued Oct. 22, 2013, the disclosures of which are incorporated herein by reference and to which priority is claimed.

FIELD OF THE INVENTION

The present invention is directed to a door facing blank having a first major surface with a design element formed therein, and an opposite second major surface. At least three longitudinally extending spaced stile receiving areas are disposed on the second major surface. Two of the stile receiving areas define a first width, and three of the stile receiving areas define a second width greater than the first width. The door facing blank may be trimmed to form a door facing having a selected width. A method of forming a door facing blank, and a mold press for forming a door facing blank are also disclosed.

BACKGROUND OF THE INVENTION

Hollow and solid core doors typically include a perimeter frame with first and second door facings secured to opposite sides of the frame. The door facings may be formed from composites of cellulosic material and resin binder, polymers, or metal.

Hollow or solid core doors may be of the 'flush' type, that is, one that is flat or planar on both major surfaces. Alternatively, one or both door facings may include contoured portions, architectural elements or textures. For example, a door facing ma's be molded to include contoured portions simulating stiles, rails and panels.

Molded and architectural features are often desirable to consumers, and may be molded or embossed into a blank during compression. However, a different die set is typically required for each size and length door facing. For example, a plurality of die sets are typically required to form door facings of different widths, even if the molded design is similar on all of the different width door facings due to the position and configuration of the molded portions on the facing. Likewise, different die sets are typically required for different length door facings, even if the molded design configuration is similar on all facings.

As such, molded door facings having contoured or architectural features are relatively expensive because the capital cost is quite high due to the need for dies, presses, and the like for each specific door facing size. The flat or planar facings used for flush doors, on the other hand, are relatively inexpensive, but do not provide the aesthetic features often desired by consumers.

SUMMARY OF THE INVENTION

The present invention is directed to a door facing blank having a first major surface intended to be exteriorly disposed and an opposite second major surface intended to be interiorly disposed. First and second planar, spaced stile receiving areas are disposed on the second major surface. A central portion is intermediate the first and second stile receiving areas. A plurality of grooves are formed in the first major surface and define a design element. At least one of the grooves includes an embossed portion disposed in the first major surface opposite the first and second planar spaced stile receiving areas and a molded portion disposed in the central portion. At least one of the first and second spaced stile receiving areas are trimmable to form a door facing having a selected width.

The present invention also relates to a door facing blank having a first major surface intended to be exteriorly disposed and an opposite second major surface intended to be interiorly disposed. A design element is formed in the first major surface. At least three longitudinally extending spaced stile receiving areas are disposed on the second major surface. Two of the stile receiving areas define a first width, and three of the stile receiving areas define a second width greater than the first width. The door facing blank may be trimmed to form a door facing having a selected width and having a first one of the stile receiving areas adjacent a first longitudinal edge of the door facing, and a second one of the stile receiving areas adjacent a second longitudinal edge of the door facing.

A method of forming a door is also disclosed. A perimeter frame having first and second spaced stiles defining a width is provided. First and second door facing blanks are provided. Each of the blanks has a first major surface and an opposite second major surface, a design element formed in the first major surface, and a plurality of longitudinally extending spaced stile receiving areas disposed on the second major surface. First and second stile receiving areas are selected that are spaced by a distance corresponding to the width of the first and second spaced stiles. The first and second door facing blanks are trimmed adjacent the selected first and second stile receiving areas to form first and second door facings having selected widths. The first and second door facings are then secured to opposite sides of the perimeter frame, thereby forming a door.

The present invention also relates to a mold press for forming the disclosed door facing blank. The mold press includes an upper die mold and a spaced lower die mold, which form a mold cavity for molding a substrate to form the door facing blank. The upper die mold has a plurality of protrusions disposed in a first portion and embossing features disposed in a second portion. The lower die mold has a plurality of depressions aligned with and complementary to the plurality of protrusions for forming molded features in the substrate; and planar portions aligned with the embossing features for forming stile receiving areas in the substrate. The die mold forms a door facing blank having at least three longitudinally extending spaced stile receiving areas on an intended interior surface thereof, two of the stile receiving areas defining a first width, and three of the stile receiving areas defining a second width greater than the first width. The door facing blank may be trimmed to form a door facing having a selected width.

BRIEF DESCRIPTION OF THE DRAWINGS

FIG. 1 is a plan view of a door facing blank having a design element according to an embodiment of the present invention, showing embossed portions in hatched line;

FIG. 2 is a sectional view of the door facing blank of FIG. 1 taken along line 2-2 and viewed in the direction of the arrows;

FIG. 3 is an enlarged sectional view of circled portion 3 of FIG. 1;

FIG. 4 is an enlarged sectional view of circled portion 4 of FIG. 1;

FIG. 5 is a fragmentary sectional view of a molded groove of a design element of the present invention;

FIG. 6 is a fragmentary sectional view of an embossed groove of a design element of the present invention;

FIG. 7 is a plan view of a door facing having a design element having molded and embossed portions, with embossed portions shown in hatched line;

FIG. 7A is a plan view of the door facing of FIG. 7 after trimming a first side portion;

FIG. 7B is a plan view of the door facing of FIG. 7 after trimming first and second side portions;

FIG. 8 is a plan view of a door facing blank having a design element according to another embodiment;

FIG. 11 is a plan view of a door facing blank having a design element according to another embodiment;

FIG. 12 is a plan view of a door facing blank having a design element according to another embodiment;

FIG. 13 is a plan view of a door facing blank having a design element according to another embodiment:

FIG. 14 is a plan view of a door facing blank having a design element according to another embodiment;

FIG. 15 is a plan view of a door facing blank having a design element according to another embodiment;

DETAILED DESCRIPTION OF PREFERRED EMBODIMENTS

Figure 9:
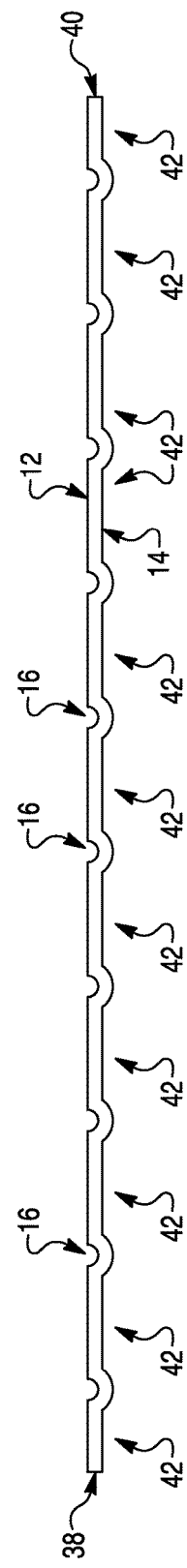
FIG. 9 is a sectional view of the door facing blank of FIG. 8 taken along line 9-9 and viewed in the direction of the arrows.

As shown in FIGS. 1 and 2, a door facing blank 10 according to the present invention includes a first major surface 12 intended to be exteriorly disposed and an opposite second major surface 14 intended to be interiorly disposed.

A design element is formed in first major surface 12. An exemplary design element according to an embodiment of the present invention is shown in FIGS. 1 and 2. The design element includes molded grooves 16 formed in a central portion 18 of blank 10, as shown in FIGS. 1-3. Molded grooves 16 extend outwardly from second major surface 14. Molded grooves 16 may include an upwardly extending central bead 20 intermediate side walls 22, 24.

The design element may also include embossed grooves 16A formed in first and second side portions 26, 28 of blank 10, as shown in FIGS. 1 and 4. Embossed grooves 16A may include upwardly extending central beads 20A intermediate side walls 72A, 24A. While embossed grooves 16A extend into first major surface 12, second major surface 14 is preferably substantially planar opposite any embossed grooves 16A, such as in first and second side portions 26, 28, as shown in FIGS. 2 and 4.

As known in the art, molding a cellulosic substrate involves re-shaping the material using heat and pressure. The cellulosic substrate is re-shaped by stretching and bending the fibers of the cellulosic material during the molding process. A geometric change in the central plane of the substrate occurs during the molding process. The central plane of a planar substrate is defined at the center of the caliper of the substrate, shown by dashed line X in FIG. 5. The depth d1 of a molded portion may be greater than the total caliper C of the substrate. For example, molded grooves 16 may be molded to a depth of about 0.07 inch or more; while the total caliper of blank 10 may be between about 0.1 to 0.2 inches. Preferably, molded grooves 16 are molded to a depth of between about 0.1 inch and about 0.5 inch. Thus, the depth d1 of molded grooves 16 may be greater than the total caliper C of blank 10. As such, a portion of molded grooves 16 extends outwardly from the plane of second major surface 14.

By contrast, embossing typically involves pressing a substrate with a textured roll or plate. This process results in a slightly contoured surface having a relatively shallow profile depth, but without a geometric change in the central plane X of the substrate, as shown in FIG. 6. Using conventional embossing techniques, the depth of a depressed portion that has been embossed into a cellulosic fiber substrate is typically less than ⅓ of the total caliper of the substrate prior to embossing. Thus, the central plane X of the cellulosic fiber substrate is not altered during the embossing process when forming embossed grooves 16A. Rather, embossed grooves 16A are simply pressed inwards toward the central plane, so that the corresponding portion of second major surface 14 opposite embossed grooves 16A is substantially planar, as shown in FIGS. 2, 4 and 6. For example grooves 16A may be embossed into first major surface 12 to a depth d2 of about 0.005 inch or more. More preferably, embossed grooves 16A are embossed to a depth d2 of between about 0.005 inch and about 0.07 inch.

Molded grooves 16 are preferably configured and positioned on blank 10 so that second major surface 14 is substantially planar on first and second side portions 26, 28. In this way, stiles of a perimeter frame may be easily secured to planar portions of second major surface 14 at a selected position on first and second side portions 26, 28. Preferably, first and second side portions 26, 28 have a width greater than the width of the stiles to be secured thereto. In this way, blank 10 may be trimmed to a selected width, while maintaining a portion of each of first and second side portions 26, 28 for accommodating stiles. In addition, molded grooves 16 and embossed grooves 16A are configured so that even if first and/or second side portions 26, 28 are trimmed, the remaining design element on the resulting door facing is aesthetically acceptable.

Referring to FIGS. 7, 7A and 7B, embossed grooves 16A extend outwardly from and linearly with corresponding molded grooves 16. The resulting design element includes a plurality of parallel grooves 16, 16A extending angularly across the entire first major surface 12, giving the appearance of a door formed from a plurality of slanted planks P. Because first and second side portions 26, 28 are embossed, they may be trimmed to achieve a door facing having a selected width, while first major surface 12 maintains the same appearance.

For example, blank 10 having molded grooves 16 in central portion 18 and embossed grooves 16A in side portions 26, 28 may be molded to have a width w1 corresponding to a standard commercial width w1 of door facing F1, e.g. a door facing having a width of about 36 inches. With minimal or no trimming, blank 10 may be used as door facing F1, as shown in FIG. 7. First side portion 26 of blank 10 may be trimmed to form a door facing F2 having a second width w2, as shown in FIG. 7A. Both first and second side portions 26, 28 may be trimmed to form a door facing F3 having a third width w3, as shown in FIG. 7B. The design element on first major surface 12, which resembles a plurality of slanted planks P, is maintained on door facings F2 and F3, despite first and/or second portions 26, 28 having been trimmed, and even if unequal portions of first and second portions 26, 28 have been trimmed.

Blank 10 may be trimmed using any conventional cutting method to form a door facing having any one of a plurality of different widths due to the configuration and positioning of molded grooves 16 and embossed grooves 16A, which maintain an aesthetically acceptable design element on all door facing widths. For example, predetermined portions of blank 10 may be trimmed to form a door facing having one of eleven selectable, widths. Conventional methods of forming door facings having the same molded design element but different widths typically require a separate die mold for each width. Blank 10 therefore substantially reduces manufacturing costs because a plurality of different width door facings may be formed from the same blank 10, which is formed from a single die mold.

It should be understood that more than three different width door facings may be formed from blank 10, given the widths of first and second side portions 26, 28 are substantially greater than the stiles to be secure thereto. Preferably, a portion of each of first and second side portions 26, 28 remains after trimming and has a width at least equal to the width of the stile to be secured thereto, so that a substantially planar longitudinally extending surface is provided for receiving the corresponding stile.

Blank 10 also preferably includes a first rail receiving area 30 adjacent a first end 32 of blank 10, and a second rail receiving area 34 adjacent a second end 36 of blank 10, as shown in FIGS. 1 and 7-7B. Rail receiving areas 30, 34 preferably extend horizontally across blank. 10, perpendicular to longitudinal edges 38, 40 thereof. As such, rail receiving areas 30, 34 extend through first and second side portions 26, 28 as well as central portion 18. Preferably, portions of the design element formed in first major surface 12 and extending into rail receiving areas 30, 34 are embossed (e.g., embossed grooves 16A), as opposed to molded (e.g. molded grooves 16). In this way, the corresponding second major surface 14 opposite rail receiving areas 30, 34 is substantially planar for accommodating, the rails of a perimeter frame.

Blank 10 may also be configured so that the design element does not extend into rail receiving areas 30, 34. For example, first major surface 12 may include upper and lower planar portions resembling rails. Further, rail receiving areas 30, 34 may be configured to be wider than the width of the rails to be secured thereto, so that portions of rail receiving areas 30, 34 may be trimmed while still maintaining a portion sufficient for accommodating the rails of the perimeter frame. In this way, blank 10 may be trimmed to firm a door facing having a selected length as well a selected width.

It should be understood that the design element formed in blank 10 is not limited to a specific configuration and position of slanted grooves 16, 16A shown in FIGS. 1, 2 and 7-7B. Moreover, the specific configurations of grooves 16, 16A are not limited to that shown in FIGS. 3 and 4. Rather, various configurations of a design element are possible with the present invention.

For example, a blank 10A may be formed having a design element including a plurality of grooves 16 extending parallel to longitudinal edges 38, 40, as shown in FIG. 8. Grooves 16 may be evenly spaced to define a plurality of longitudinally extending planks P1 having uniform widths. Planks P1 may extend from first end 32 of blank 10A to second end 36.

Figure 10:
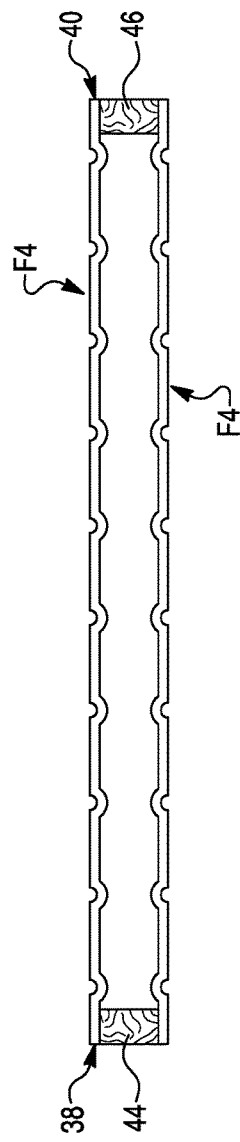
FIG. 10 is a sectional view of a door according to the present invention.

The design element of blank 10A may include all molded grooves 16, as shown in FIG. 9. Because molded grooves 16 include portions extending outwardly from second major surface 14, molded grooves 16 are preferably spaced to form stile receiving areas 42 disposed on second major surface 14 at predetermined positions. For example, blank 10A may include eleven stile receiving areas 42. Blank 10A is configured so that stile receiving areas 42 adjacent longitudinal edges 38, 40 accommodate first and second stiles 44, 46 of a perimeter frame, as shown in FIGS. 9 and 10. Stile receiving areas 42 are preferably substantially planar.

Similar to blank 10, the entire width of blank 10A defines a door facing F4 having a width (e.g. first width w1) which includes all molded grooves 16, as shown in FIGS. 8-10. Molded grooves 16 are spaced and configured in such a way so that blank 10A may be trimmed to any one of a plurality of door facing sizes. Specified portions of blank 10A are removed so that second major surface 14 can still accommodate stiles 44, 46 after trimming. The rails of the perimeter frame may be notched to accommodate molded grooves 16. Thus, a plurality of different door facings may be formed from a single blank 10A, and thus from a single die mold.

It should be understood that the specific widths of planks P1 (or P) and spacing of grooves 16 may vary as desired. For example, planks P1 (or P) may have substantially uniform widths of at least about 3 inches, and grooves 16 may be offset from a longitudinal center plane, as shown by clashed line Y in FIG. 8. Such a configuration and position of grooves 16 allows blank 10A to be trimmed to form a door facing having any one of a plurality of widths (e.g. standard commercial widths of 12 inches, 18 inches, 20 inches, 24 inches, 26 inches, 28 inches, 30 inches, 32 inches, 34 inches, or 36 inches; or standard commercial metric doors widths as known in the art). Thus, blank 10A may be used to form 10 or more different door facings having different widths.

Each plank P1 preferably has a width at least equal to the width of stile 44 (or 46), given the width of planks P1 define the width of stile receiving areas 42, as shown in FIGS. 9 and 10. In addition, the widths of planks P1 need not be uniform. For example, a blank 10B having a design element including a plurality of molded grooves 16 (and/or embossed grooves 16A) may be provided wherein the widths of planks P2 vary, as shown in FIG. 11.

Design elements may be provided wherein molded grooves 16 (and/or embossed grooves 16A) do not extend across the entire first major surface 12 from first end 32 to second end 36, or from longitudinal edge 38 to longitudinal edge 40. For example, a blank 10C having a design element including a first rail portion 48 adjacent first end 32 and a second rail portion 50 adjacent second end 36, as shown in FIG. 12. First and second rail portions 48, 50 are preferably substantially planar. As such, corresponding rail receiving areas 30, 34 are provided on second major surface 14, as described above, which are likewise planar and accommodate rails of the perimeter frame. First and second rail portions 48, 50 are preferably defined by embossed grooves 16A, so that a planar surface extends the entire length of the blank for accommodating stiles of the perimeter frame.

Blanks 10D, 10E and 10F having other exemplary design elements including linearly extending, molded grooves 16 and/or embossed grooves 16A are shown in FIGS. 13, 14 and 15. As described above, the design element may include both molded and embossed features. Design elements including features primarily extending horizontally, such as the design element of blank 10F shown in FIG. 15, preferably include embossed grooves 16A in first and second side portions 26, 28, and molded grooves 16 in central portion 18, as described above.

Figure 16:
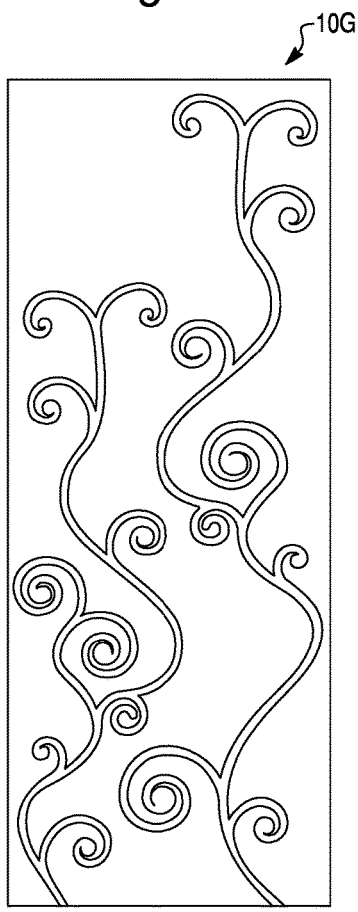
FIG. 16 is a plan view of a door facing blank having a design element according to another embodiment.
Figure 17:
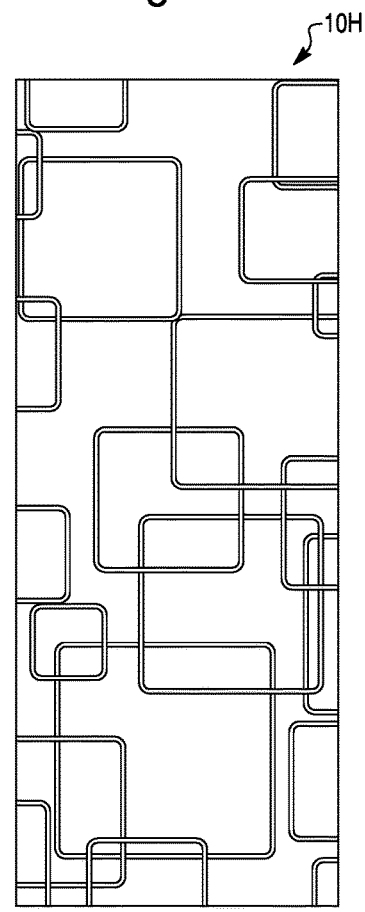
FIG. 17 is a plan view of a door facing blank having a design element according to another embodiment.

The design element formed in the blank of the present invention is not limited to parallel, linearly extending grooves 16, 16A. For example, a blank 10G having an organic design element may be formed in first major surface 12, as shown in FIG. 16. Any organic design element; such as a design pattern having the characteristics of a living organism(s) such as a plant or flower, may be formed in first major surface 12. Alternatively, a blank 10H having a design element including a geometric configuration may be formed in first major surface 12, as shown in FIG. 17. Any geometric design element, such as a design pattern characterized by straight lines, triangles, circles, squares, or similar regular forms, may be formed in first major surface 12.

It should be understood that relatively complex design elements may also be provided, such as a plurality of concentric circles or textured surface. It may be desirable to form such complex design elements by embossing only, given it may be more difficult to mold such features compared to embossing. However, all design elements provide that the blank may be easily trimmed to any desired length and width while maintaining a commercially acceptable design element on first major surface 12.

Other molded and/or embossed design elements not specifically shown in the figures are also within the scope of the disclosed invention. Regardless of the specific design element provided, predetermined portions of the blank may be trimmed along one or both longitudinal edges 38, 40 to achieve the desired facing width, while providing areas on second major surface 14 for accommodating stiles and/or rails (e.g. planar first and second side portions 26, 28; stile receiving areas 42; and/or rail receiving areas 30, 34).

Figure 18:
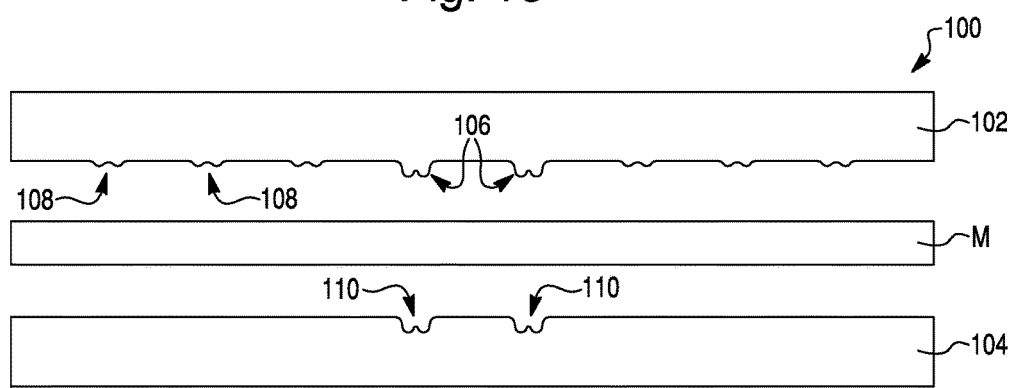
FIG. 18 is a sectional view of a mold press according, to the present invention.

The cost of manufacturing a plurality of door facings having different widths but similar design elements is substantially reduced given one blank e.g. blanks 10-10H) may be used to form a door facing having a selected width and length. Moreover, only one die mold is required to form the blank, thereby minimizing the number of die molds required. Referring to FIGS. 1, 2 and 18, blank 10 may be formed from a mat M of cellulosic fiber material and resin binder, as known in the art. Mat M is disposed within a mold press 100 having an upper die mold 102 and a lower die mold 104, and compressed therebetween using heat and pressure. Upper die mold 102 may include outwardly extending protrusions 106 for forming molded portions 16 in the resulting blank 10, and embossing portions 108 for forming embossed portions 16A. Lower die mold 104 includes depressions 110 corresponding to protrusions 106. However, areas corresponding to embossing portions 108 are planar, thereby forming planar areas on second major surface 14 of the resulting blank 10 (e.g. first and second side portions 26, 28).

Thus, one mold press 100 having the desired design element may be used to form a plurality of door facings having different widths, thereby substantially reducing manufacturing costs. While die mold 100 is described as molding a cellulosic mat M, it should be understood that a die mold for post-molding a wood composite panel may also be provided, or for molding other materials such as a polymer composite (e.g. sheet molding compound or fiberglass reinforced composites) or metal (e.g. steel or aluminum).

The present invention is also directed to a method of forming a door. A perimeter frame having first and second spaced stiles 44, 46 is provided. First and second door facing blanks 10 for blanks 10A-H) are provided having a design element, as described above, and a plurality of stile receiving areas 42. First and second stile receiving areas 42 are selected, which are spaced by a predetermined distance. Blanks 10 are then trimmed adjacent the selected stile receiving areas 42, thereby forming door facings having widths that will correspond to the width of the perimeter frame. The door facings may then be secured to opposite sides of the perimeter frame, as shown in FIG. 10.

While the invention has been described in connection with specific embodiments thereof, it will be understood that it is capable of further modifications. This application is intended to cover any such modifications, variations, or adaptations of the invention provided they come within the scope of the following claims or their equivalents.

We claim:

1. A door facing blank, comprising:
   an intermediate portion, first and second side portions adjacent to and integral with opposite sides of the intermediate portion and associated with opposite side edges of the door facing blank,
   an exterior surface comprising a molded groove extending across at least part of the intermediate portion, and an embossed groove extending across at least part of the first side portion but not extending into the intermediate portion, the molded groove and the embossed groove situated continuous with one another to establish a continuous groove in the exterior surface, and
   an interior surface deformed by the molded groove but not the embossed groove to provide the intermediate portion with a corresponding, protrusion opposite to the molded groove and to provide the first side portion with a corresponding protrusion-free, substantially flat stile-receiving area opposite to the embossed groove.

2. The door facing blank of claim 1, wherein the stile-receiving areas are trimmable to reduce an overall width of the door facing blank.

3. The door facing blank of claim 1, wherein said molded groove has a depth between about 0.1 inch and 0.5 inch.

4. The door facing blank of claim 3, wherein the embossed groove has a depth between about 0.005 inch and about 0.007 inch.

5. The door facing blank of claim 1, wherein the molded groove and the embossed groove have first and second depths, respectively, and wherein the first depth is greater than the second depth.

6. The door facing blank of claim 1, wherein said molded groove has a depth that is greater than a thickness of the door facing blank.

7. The door facing blank of claim 1, wherein the molded groove and the embossed groove are linearly arranged with respect to one another to form a continuous line.

8. The door facing blank of claim 1, wherein the exterior surface comprises an additional embossed groove continuous with the molded groove and extending across at least part of the second side portion, and wherein the interior surface is not deformed by the additional embossed groove to provide the second side portion with an additional corresponding protrusion-free, substantially flat stile-receiving area opposite the additional embossed groove.

9. The door facing blank of claim 8, wherein the molded groove, the embossed groove, and the additional embossed groove are linearly arranged with respect to one another to form a continuous line.

10. A door facing blank, comprising:
    an intermediate portion, first and second side portions adjacent to and integral with opposite ends of the intermediate portion and associated with opposite end edges of the door facing blank, an exterior surface comprising a molded groove extending across at least part of the intermediate portion, and an embossed groove extending across at least part of the first end portion but not extending into the intermediate portion, the molded groove and the embossed groove situated continuous with one another to establish a continuous groove in the exterior surface, and an interior surface deformed by the molded groove but not the embossed groove to provide the intermediate portion with a corresponding protrusion opposite to the molded groove and to provide the first end portion with a corresponding protrusion-free, substantially flat rail-receiving area opposite to the embossed groove.

11. The door facing blank of claim 10, wherein the rail-receiving areas are trimmable to reduce an overall width of the door facing blank.

12. The door facing blank of claim 10, wherein said molded groove has a depth between about 0.1 inch and 0.5 inch.

13. The door facing blank of claim 12, wherein the embossed groove has a depth between about 0.005 inch and about 0.007 inch.

14. The door facing blank of claim 10, wherein the molded groove and the embossed groove have first and second depths, respectively, and wherein the first depth is greater than the second depth.

15. The door facing blank of claim 10, wherein said molded groove has a depth that is greater than a thickness of the door facing blank.

16. The door facing blank of claim 10, wherein the molded groove and the embossed groove are linearly arranged with respect to one another to form a continuous line.

17. The door facing blank of claim 10, wherein the exterior surface comprises an additional embossed groove continuous with the molded groove and extending across at least a part of the second end portion, and wherein the interior surface is not deformed by the additional embossed groove to provide the second end portion with an additional corresponding protrusion-free, substantially flat rail-receiving area in opposite the additional embossed groove.

18. The door facing blank of claim 17, wherein the molded groove, the embossed groove, and the additional embossed groove are linearly arranged with respect to one another to form a continuous line.

19. A door comprising:
a door frame having opposite first and second sides; and
the door facing blank of claim 10 secured to the first side of the door frame.

20. A door, comprising:
a door frame having opposite first and second sides, the door frame comprising first and second stiles and upper and lower rails; and
a door facing blank secured to the first side of the door frame, the door facing blank comprising
an intermediate portion,
first and second side portions adjacent to and integral with opposite sides of the intermediate portion and associated with opposite side edges of the door facing blank,
an exterior surface comprising a molded groove extending across at least part of the intermediate portion, and an embossed groove extending across at least part of the first side portion but not extending into the intermediate portion, the molded groove and the embossed groove situated continuous with one another to establish a continuous groove in the exterior surface, and
an interior surface deformed by the molded groove but not the embossed groove to provide the intermediate portion with a corresponding protrusion opposite to the molded groove and to provide the first side portion with a corresponding protrusion-free, substantially flat stile-receiving area opposite to the embossed groove, the substantially flat stile-receiving area contacting the first stile of the door frame.

* * * * *